(12) United States Patent
Marson

(10) Patent No.: US 7,001,627 B2
(45) Date of Patent: Feb. 21, 2006

(54) VERTICAL ROTISSERIE BASTING OVEN

(76) Inventor: Louis A. Marson, 6631 E. Wilshire, Scottsdale, AZ (US) 85257

( * ) Notice: Subject to any disclaimer, the term of this patent is extended or adjusted under 35 U.S.C. 154(b) by 420 days.

(21) Appl. No.: 10/198,200

(22) Filed: Jul. 17, 2002

(65) Prior Publication Data

US 2004/0011217 A1 Jan. 22, 2004

(51) Int. Cl.
*A23L 1/01* (2006.01)
*A47J 37/04* (2006.01)

(52) U.S. Cl. .......................... 426/233; 99/327; 99/345; 99/421 H; 99/446; 426/523

(58) Field of Classification Search ................ 426/233, 426/523; 99/345, 321 H, 400, 446, 327, 421 H
See application file for complete search history.

(56) References Cited

U.S. PATENT DOCUMENTS

| | | | |
|---|---|---|---|
| 1,732,010 A | 10/1929 | Goodell | |
| 1,874,791 A | 8/1932 | Murff | |
| 4,061,083 A | 12/1977 | Caliva | |
| 4,177,721 A | 12/1979 | Redhead | |
| 4,230,066 A | 10/1980 | Lents | |
| 5,515,774 A | * 5/1996 | Swisher et al. | ........... 99/421 H |
| 5,639,497 A | * 6/1997 | Bedford et al. | ............. 426/233 |

* cited by examiner

*Primary Examiner*—George C. Yeung
(74) *Attorney, Agent, or Firm*—Jeffrey D. Moy; Harry M. Weiss; Weiss, Moy & Harris, P.C.

(57) ABSTRACT

A rotisserie oven comprising a central heating section having a vertical orientation and dividing the cooking space into two equal, independent, and evenly heated roasting chambers; at least two rotisserie rods each driven by a motor; at least two removable basting troughs positioned above the rotisserie rods; at least two drip collection pans positioned below the rotisserie rods; an ash drawer positioned below the central heating section; and a control panel. By inserting a basting fluid in the basting trough, the roasting meat is automatically basted with the dripping basting fluid. The excess basting fluid and the meat juices is collected and can easily be recycled during the roasting process. By providing parts that are removable and have a simple mechanical design, cleaning and maintenance can be kept at a minimum. Mounting the rotisserie oven on top of a cabinet results in added convenience, accessibility, and flexibility.

18 Claims, 4 Drawing Sheets

VERTICAL ROTISSERIE BASTING OVEN

BACKGROUND OF THE INVENTION

1. Field of the Invention

The present invention relates generally to rotisserie ovens and, more specifically, to a rotisserie oven having a vertical oriented central heating section, a device for basting the item being cooked, and a method for automatically basting the item while roasting.

2. Description of the Prior Art

Rotisserie ovens for roasting or otherwise cooking a variety of meats are well known in the art. Such rotisserie ovens usually include a cooking chamber with at least one rotating rod for carrying the meat and at least one heating element. However, the interior and the heating elements of such rotisserie ovens are typically hard to clean because of the grease involved in the cooking process. Thus, prior art ovens require a relatively high maintenance. Another problem encountered with prior art rotisserie ovens is the difficulty to provide even heat distribution throughout the cooking chamber. Furthermore, prior art rotisserie ovens are not easy accessible for cleaning or maintenance.

In general, meat roasted in a prior art rotisserie oven tends to dry out while cooking. Thus, basting of the meat several times during the cooking process is necessary to preserve the juices and the flavor of the meat. The prior art discloses several devices for basting meat while roasting. For example, U.S. Pat. No. 1,723,010 issued to Goodell and U.S. Pat. No. 1,874,791 issued to Murff show means for circulating the basting liquid from the drip pan and discharging the liquid over the rotating meat. While Goodell uses spray heads mounted in a fixed position over the rotating meat to spray the basting liquid onto the meat; Murff shows a roasting pan in which the meat is rotatably supported within the pan and automatic circulation of the juices occurs so that the juices flow to an upper portion of the device and drop onto the meat. However, both designs require a separate spray head or roasting pan for each piece of meat and therefore, are relatively complicated, not easily adjustable, and require relatively high maintenance. Further, both devices only recycle the meat juices while omitting the possibility of adding any other basting fluid, such as flavored basting fluid.

U.S. Pat. No. 4,061,083 issued to Caliva and U.S. Pat. No. 4,177,721 issued to Redhead show devices for basting meat while roasting without recycling the dripped meat juices. While Caliva uses a hollow, elongated, and cylindrical container with apertures that rotate over the roasting meat, Redhead fastens a basting dispenser directly to the meat. However, both of these devices also have several drawbacks. For example, both devices cannot be easily refilled during the roasting process, require a relatively high number of parts and thus, have a relatively high maintenance. U.S. Pat. No. 4,230,066 issued to Lents discloses an apparatus for basting and displaying food having a rotary carrousel, which periodically dips the food into a basting liquid to keep food warm and moist. However, the dipping of the food into the basting liquid can result in an over saturating of the meat with basting liquid and is not applicable for roasting meat in a typical rotisserie oven.

Therefore a need existed to provide a rotisserie oven of relatively low maintenance that has a relatively simple mechanical design with parts being easily accessible and removable for cleaning. A further need existed to provide a rotisserie oven with a central heating section to provide an even heat distribution throughout the cooking chamber.

A still further need existed to provide a rotisserie oven that includes means for basting the meat automatically during the roasting process with a basting fluid as well as its own juices, or a combination thereof, having a simple mechanical design to be relatively easy to use, non-clogging, refillable during the roasting process, easy to clean, low in maintenance, and relatively inexpensive.

A still further need existed to provide a rotisserie oven that includes means for basting the meat during the roasting process being independent from the shape, size, or count of the meat pieces to be roasted.

A still further need existed to provide a cabinet for use in connection with the rotisserie oven for added convenience, accessibility, and flexibility.

SUMMARY OF THE INVENTION

An object of the present invention is to provide an improved rotisserie oven that is easy to use, clean, and maintain.

It is a further object of the present invention to provide a rotisserie oven with a central heating section.

It is a still further object of the present invention to provide a rotisserie oven including means for basting the meat automatically during the roasting process.

It is a still further object of the present invention to provide a cabinet for use in connection with the rotisserie oven.

BRIEF DESCRIPTION OF THE PREFERRED EMBODIMENTS

In accordance with one embodiment of the present invention, a rotisserie oven is disclosed which comprises, in combination: a central heating section having a vertical orientation and dividing the cooking space into two independent, and evenly heated roasting chambers; at least one rotisserie rod driven by a motor; at least one removable basting trough positioned above the rotisserie rod; at least one drip collection pans positioned below the rotisserie rod; an ash drawer positioned below the central heating section; and a control panel.

In accordance with another embodiment of the present invention, a rotisserie oven is disclosed which further comprises a cabinet; including a cabinet wrap having at least one cabinet door in the front, a foldable extension shelf on either side, and a shelf inside.

In accordance with still another embodiment of the present invention, a method for basting meat while roasting is disclosed, comprising, in combination the steps of: providing the rotisserie oven according to the present invention; burning a heating material in the central heating section; roasting the meat rotating on a rotisserie rod, automatically basting the roasting meat with a basting fluid dripping from the basting trough; collecting excess basting fluid and meat juices for recycling; and controlling roasting process including roasting time and temperature using the control panel.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
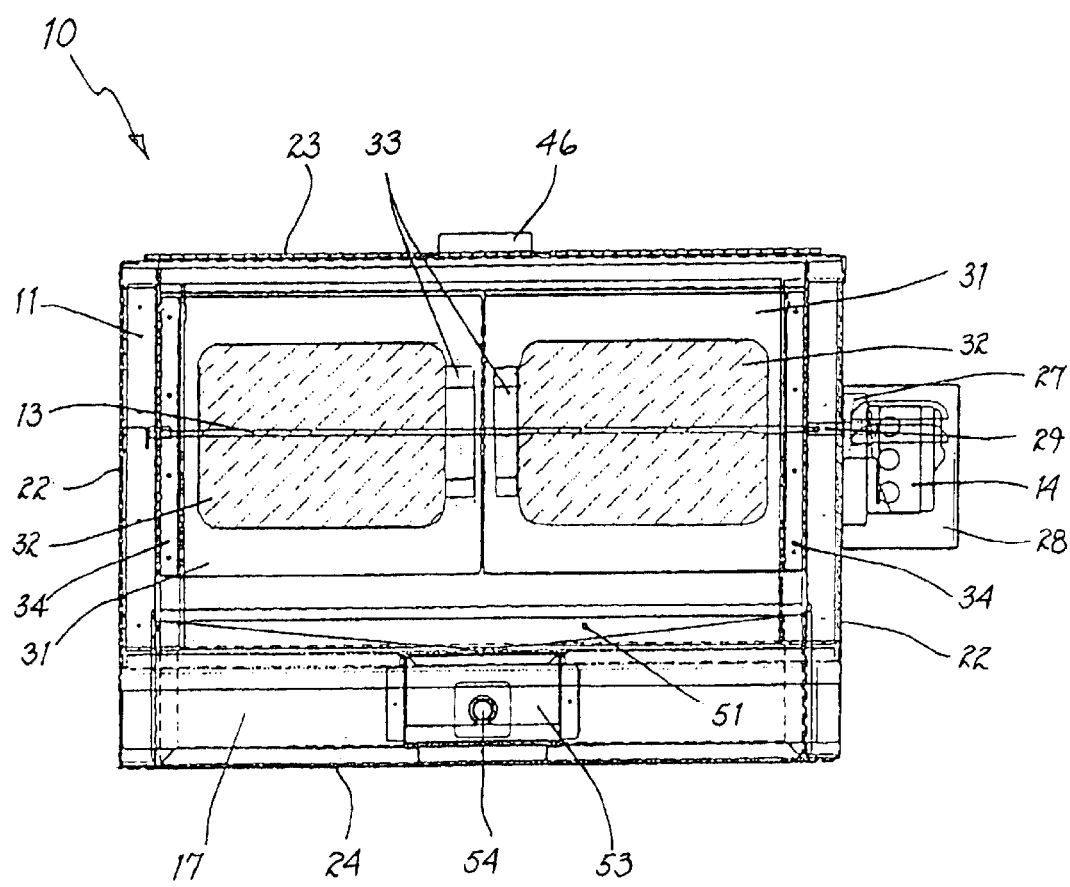
FIG. 1 is a front view of the rotisserie oven according to the present invention.
Figure 2:
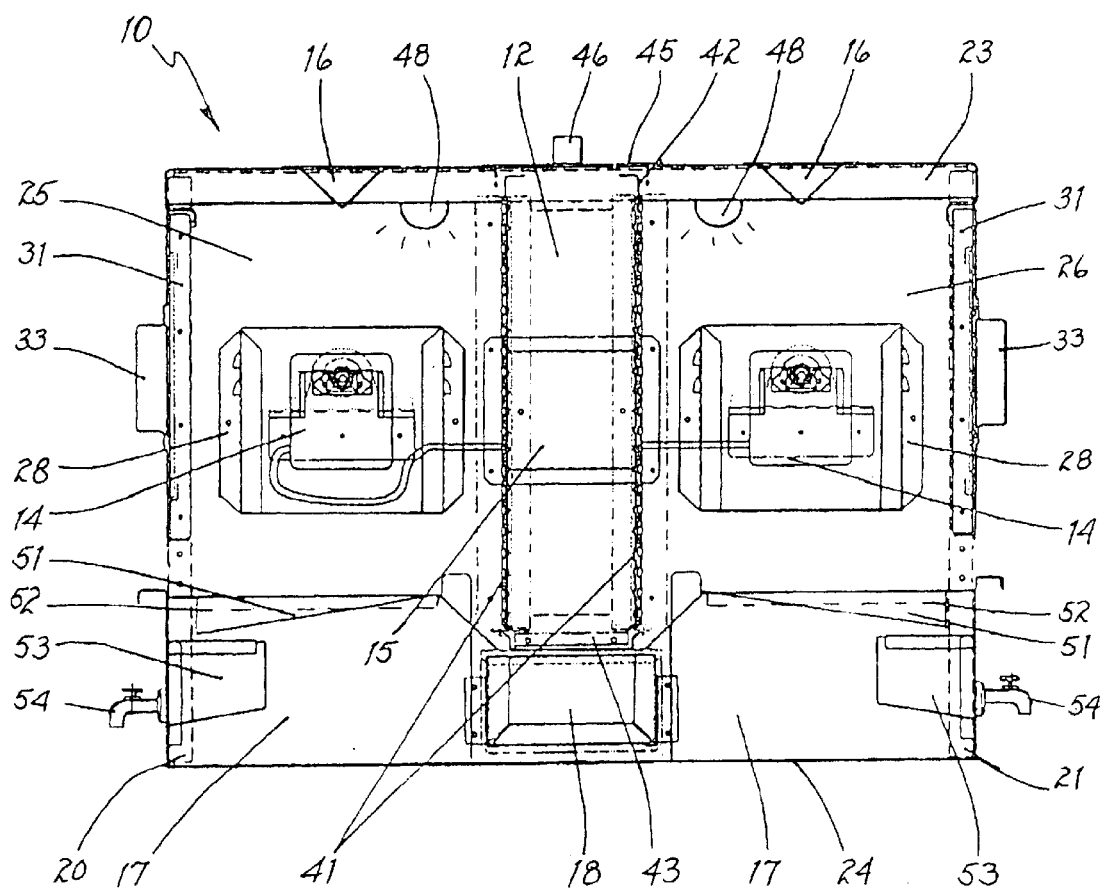
FIG. 2 is a side view of the rotisserie oven according to the present invention.
Figure 3:
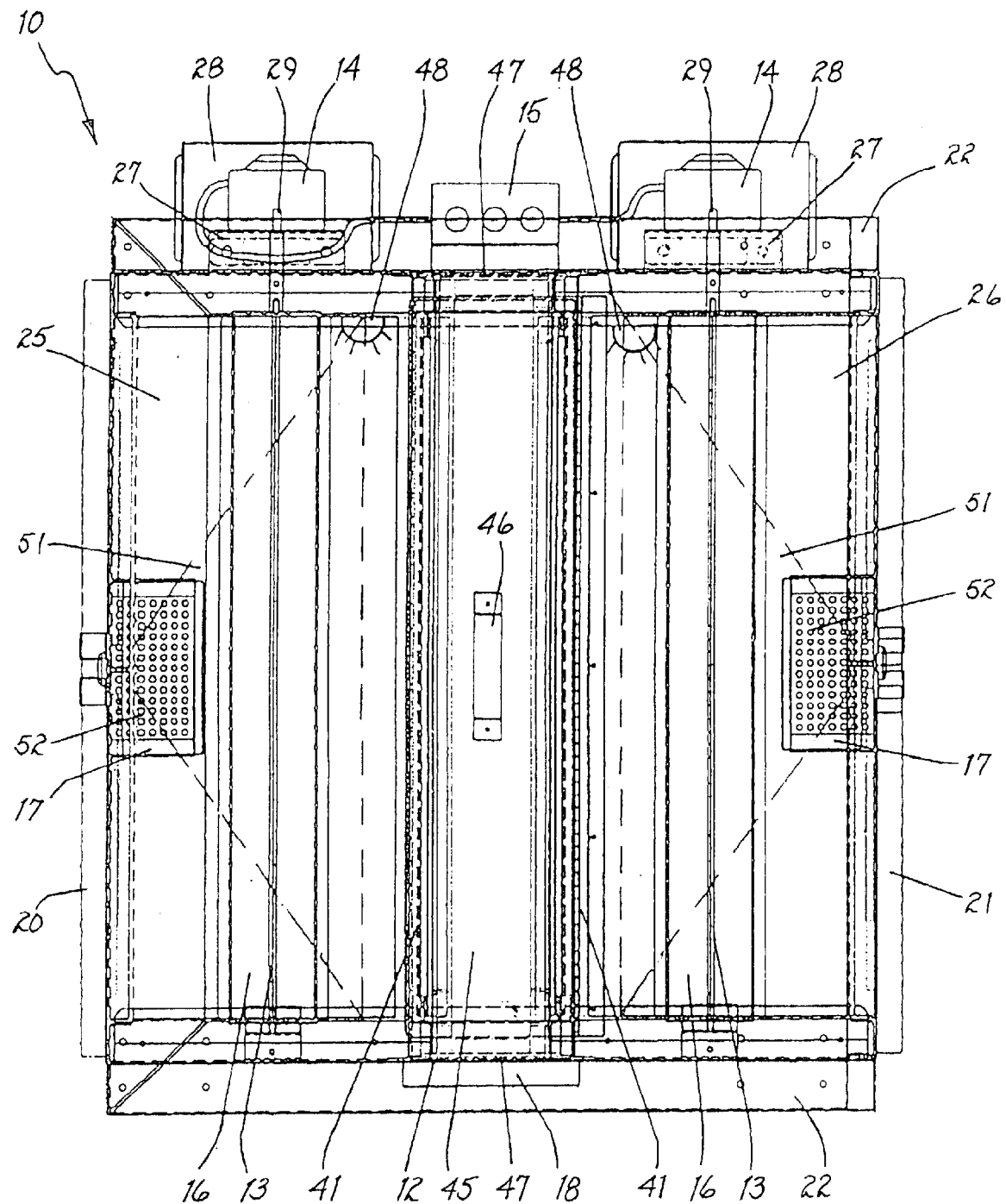
FIG. 3 is a top view of the rotisserie oven according to the present invention.

Referring to FIGS. 1, 2, and 3, a rotisserie oven 10 according to the present invention is shown. The rotisserie oven 10 generally comprises, in combination: a housing 11, a vertical oriented central heating section 12, one or more rotisserie rods 13 each driven by a motor 14, a control panel 15, one or more basting troughs 16, one or more drip collection pans 17, and an ash drawer 18. The housing 11 encloses the cooking space and includes a front panel 20 and a back panel 21, side panels 22, a top panel 23, and a bottom panel 24.

As shown in FIG. 1, a front view of the rotisserie oven 10, the front panel 20 includes two oven doors 31 having a glass window 32 and a handle 33. The oven doors 31 are mounted with hinges 34 to the front panel 20 so that they can be opened toward the outside and make the interior of the rotisserie oven 10 easily accessible. The motor 14 is covered with a motor cover 28 and mounted onto the outside of the side panel 22 with a motor mount 27. A drive shaft 29 connects the rotisserie rod 13 with the motor 14 so that the rotisserie rod 13 can be rotated to allow even meat roasting.

Referring now to FIG. 2, a side view of the rotisserie oven 10 according to the present invention is shown. The central heating section 12 has a vertical orientation and divides the cooking space into two independent, and evenly heated roasting chambers 25 and 26. The central heating section 12 is defined by screens 41 and held by a stoke guide 42 facing both roasting chambers 25 and 26, and a stoke heat shield 47 (See FIG. 3) facing the side panels 22. The central heating section 12 can receive hot coals, wood, or alternatively, contain a heating source such as gas/propane jets, or an electrical heating element. An ash screen 43 is mounted at the bottom of the central heating section 12 to allow the ashes produced during the burning process to fail into an ash drawer 18 located below the central heating section 12. The central heating section 12 is covered at the top with a stoke cover 45 that can be opened and closed with a handle 46 for easy loading of the central heating section 12 with heating materials. The ash drawer 18 can be easily removed by pulling it out of the housing 11 for emptying and cleaning. The central heating section 12 is designed to provide an even heat distribution throughout both roasting chambers 25 and 26.

As shown in FIG. 2, a basting trough 16 is inserted into an opening of the top panel 23 on either side of the central heating section 12 preferably over the rotisserie rod 13. The basting trough 16 has a v-shape with apertures at the bottom. The basting trough 16 can be easily filled and refilled with a basting fluid as well as its own juices, or a combination thereof, so that the meat can be basted automatically during the roasting process. It should be noted that basting may also be done manually by the individual user. The basting trough 16 can be easily removed for cleaning. The basting fluid drips onto the meat rotating on the rotisserie rod 13. Any excess basting materials as well as the meat juices drip into the drip collection pan 17 located below the rotisserie rod 13. The drip collection pan 17 is designed as a drawer and thus, easy removable for cleaning and maintenance. The drip collection pan 17 includes a drip hopper 51 covered with a drip screen 52 that directs the fluid toward a drip cup 53. In one embodiment, the drip cup 53 can be equipped with a faucet 54 so that the fluid can be easily drained and can be used for periodically refilling the basting trough 16 by hand. In another embodiment, a pump can be installed outside of the drip cup 53 as a replacement of or in addition to the faucet 54 for automated recycling of the fluid into the basting trough 16. The simple design of the basting trough 16 as well as the filtering of the fluid at the drip screen 52 before collecting it in the drip cup 53 provides a non-clogging basting system.

Referring now to FIG. 3, a top view of the rotisserie oven 10 according to the present invention is shown. The vertical central heating section 12 divides the cooking space into two independent roasting chambers 25 and 26. Each roasting chamber 25 and 26 include a basting trough 16 positioned over a rotisserie rod 13, and a drip collection pan 17 positioned below the rotisserie rod 13. Each rotisserie rod 13 can hold at least one piece of meat to be roasted and is connected through a drive shaft 29 with a motor 14 and can so be rotated as desired. Each roasting chamber 25 and 26 can also include a light source 48. A control panel 15 is mounted onto the outside of the side panel 22 that can include a thermostat, a light switch, a clock, a timer, a motor switch and/or a computer processor for automated control of the roasting process.

Since both roasting chambers 25 and 26 are equally designed and can be operated separately, it is possible to roast different kinds of meat at the same time and/or use different basting fluids in either roasting chamber.

Figure 4:
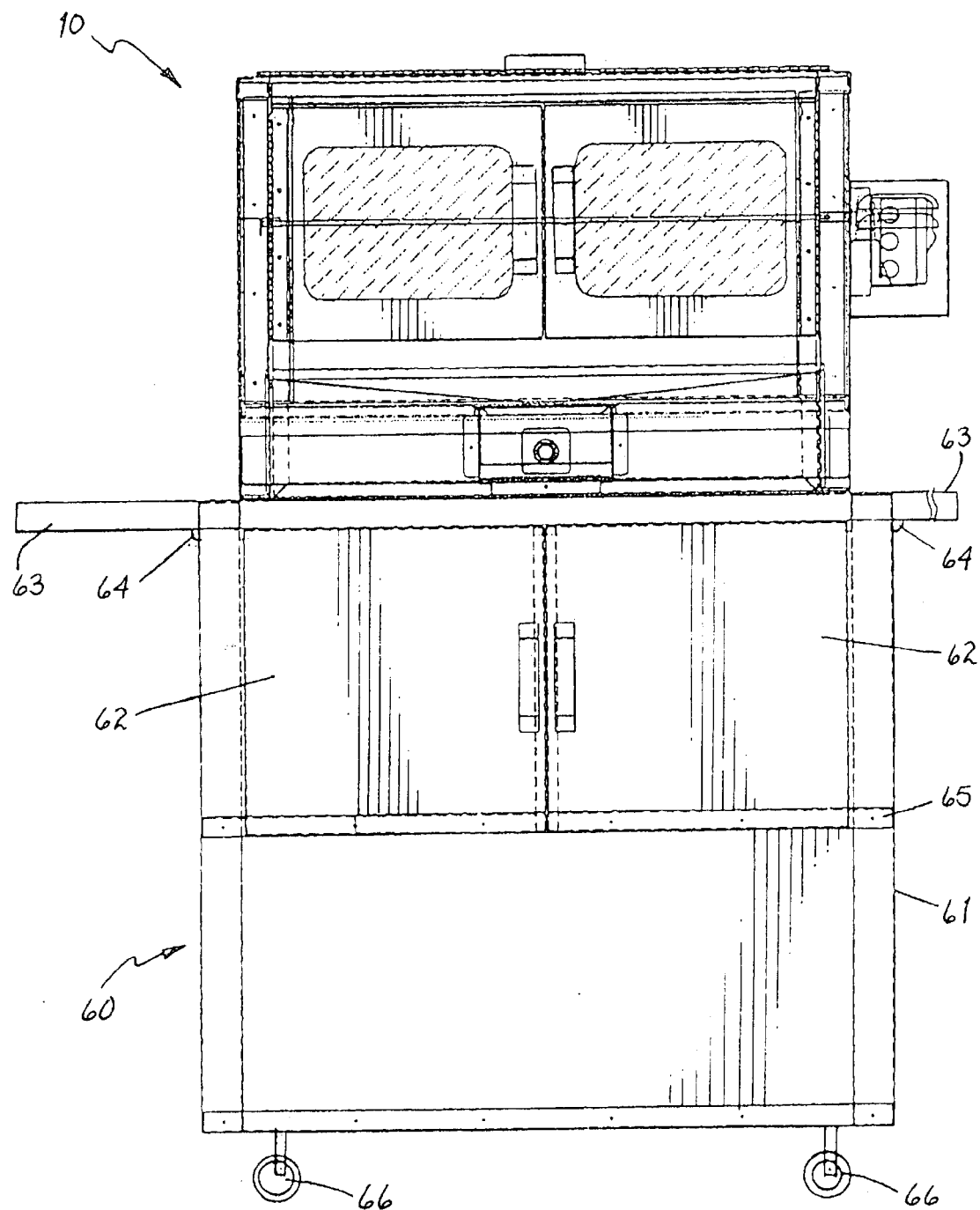
FIG. 4 is a front view of the rotisserie oven mounted on top of a cabinet according to the present invention.

Referring now to FIG. 4, a front view of the rotisserie oven 10 mounted on top of a cabinet 60 according to the present invention is shown. By mounting the rotisserie oven 10 on top of a cabinet 60, as shown in FIG. 4, convenience and accessibility are added. The cabinet 60 includes a cabinet wrap 61 with at least one cabinet door 62 in the front and/or in the back, a foldable extension shelf 63 mounted with a hinge 64 onto either side of the cabinet 60, and a shelf 65 inside the cabinet wrap 61 that may be adjustable. The cabinet 60 can be put on wheels 66 to be easily moved around if necessary.

While a rotisserie oven with one vertically oriented central heating section 12 has been discussed it is possible to build a rotisserie oven with more than one vertical oriented central heating section 12 adding more roasting chambers. It is also possible to use multiple rotisserie rods 13 in each roasting chamber 25 and/or 26 in combination with multiple or bigger basting troughs 16.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A rotisserie oven comprising, in combination:

a housing enclosing a cooking space;

a central heating section having a vertical orientation and dividing said cooking space into two independent roasting chambers;

each of said roasting chambers includes:

at least one rotisserie rod driven by a motor, at least one removable basting trough positioned above said rotisserie rod, and at least one drip collection pan positioned below said rotisserie rod;

an ash drawer positioned below said central heating section; and a control panel coupled to the outside of the housing.

2. The rotisserie oven of claim 1, wherein said housing has a front panel comprising two oven doors having a glass window and a handle.

3. The rotisserie oven of claim 1, wherein said housing has a back panel comprising two oven doors having a glass window and a handle.

4. The rotisserie oven of claim 1, wherein said central heating section has screens facing said roasting chambers, heat shields facing side panels, an ash screen facing a bottom section, and a stoke cover at top section.

5. The rotisserie oven of claim 1, wherein said central heating section further comprises gas jets.

6. The rotisserie oven of claim 1, wherein said central heating section receives a heating material selected from the group consisting of coals, wood, gas, and combinations thereof.

7. The rotisserie oven of claim 1, wherein said drip collection pans comprises:

removable drawers; and a drip hopper covered with a drip screen and a drip cup.

8. The rotisserie oven of claim 1, wherein said basting troughs are v-shaped with apertures at the bottom.

9. The rotisserie oven of claim 1, further comprising a drip cup.

10. The rotisserie oven of claim 9, wherein said drip cup further comprises a pump.

11. The rotisserie oven of claim 1, wherein said control panel further comprises at least one member selected from the group consisting of a thermostat, a light switch, a clock, a timer, a motor switch, and a microprocessor.

12. The rotisserie oven of claim 1, wherein each of said roasting chambers further comprises a light source.

13. The rotisserie oven of claim 1, further comprising a cabinet.

14. The rotisserie oven of claim 13, wherein said cabinet further comprises a cabinet wrap having at least one cabinet door in the front, a foldable extension shelf on either side, and a shelf inside.

15. The rotisserie oven of claim 13, wherein a shelf inside a cabinet wrap is adjustable in height.

16. The rotisserie oven of claim 13, wherein said cabinet further comprises wheels.

17. The rotisserie oven of claim 13, further comprising at least one cabinet door in a back section.

18. A method for basting meat while roasting, comprising, in combination the steps of:

providing a housing that encloses a cooking space;

providing a central heating section having a vertical orientation and dividing said cooking space into two independent roasting chambers;

providing each of the roasting chambers with at least one rotisserie rod driven by a motor;

providing at least two removable basting troughs positioned above said rotisserie rods;

providing at least two drip collection pans positioned below said rotisserie rods;

providing an ash drawer positioned below said central heating section;

providing a control panel;

burning a heating material in said central heating section;

putting at least one piece of meat on said rotisserie rod;

inserting said rotisserie rod into one of said roasting chambers;

rotating said rotisserie rod with said motor while meat is roasted;

inserting a basting fluid into said basting trough;

automatically basting roasting meat with said basting fluid dripping onto said meat;

collecting excess basting fluid and meat juices in said drip collection pan;

recycling said basting fluid and meat juices by refilling said basting trough with fluid from said drip collection pan; and controlling the roasting process including roasting time and temperature using said control panel.

* * * * *